United States Patent Office 3,472,578
Patented Oct. 14, 1969

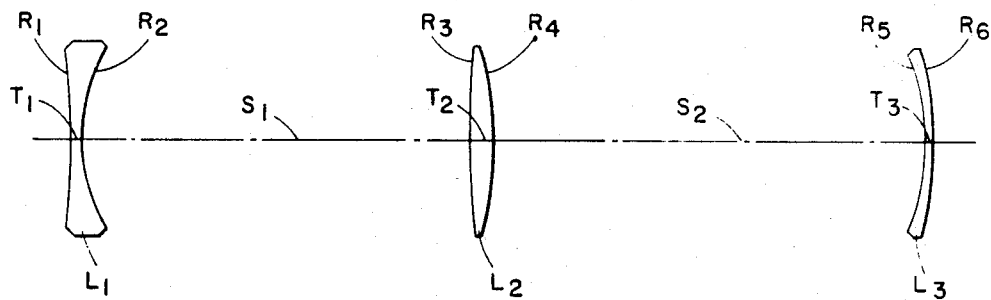

3,472,578
REVERSED GALILEAN VIEWFINDER
William H. Price, Rochester, N.Y., assignor to Eastman Kodak Company, Rochester, N.Y., a corporation of New Jersey
Filed July 13, 1967, Ser. No. 653,093
Int. Cl. G02b 3/00
U.S. Cl. 350—212                    1 Claim

ABSTRACT OF THE DISCLOSURE

A reversed Galilean viewfinder having a long overall length and comprising a negative objective, a positive middle element, and a negative rear element.

---

This invention relates to reversed Galilean-type viewfinders and particularly to such viewfinders having a long overall length.

Viewfinders of the reversed Galilean type comprise a negative objective lens and a positive eye lens, and are usually designed with a relatively short overall length which in many camera applications is a desirable feature. However, it is sometimes necessary that such a viewfinder system have a long overall length, such as when it is used with a long narrow camera, for example a movie camera. One solution to such a requirement is to provide a reversed Galilean viewfinder having an exceptionally long eye relief to permit the eye to be located at a substantial distance behind the eyepiece. To provide such long eye relief, an eyepiece is generally used having a larger diameter than is ordinarily employed in such viewfinders. Obviously with ordinary viewfinders having a small eyepiece, the eye located at a substantial distance behind the eye lens would merely see through a small axial portion of the negative objective and would not see the entire field. This difficulty is overcome by making the eye lens relatively large in diameter.

Image magnification by such two-element systems is dependent on the lens element powers and their separations. However, increasing the powers of these lenses usually results in a decrease of image quality. Particularly noticeable aberrations in such systems are distortion, field curvature and coma. Yet, the correction for three aberrations requires freedom of design of three parameters. Consequently, such systems commonly include as aspheric surface to correct one of the aberrations, usually distortion. Such aspheric surfaces increase the difficulty and expense of manufacturing the system.

Another problem with reversed Galilean viewfinders as described above, when constructed as part of a long narrow camera, is that the eyepiece of the system is commonly displaced from the aperture in the camera housing through which the field is viewed. Since it is impractical to clean a deeply recessed lens, the aperture is usually provided with a glass or plastic covering window to prevent the accumulation of dust in the recess.

It is an object of this invetnion to provide a reversed Galilean viewfinder having a long overall length, which is well corrected for distortion, field curvature, and coma without requiring the use of aspheric surfaces.

It is another object of this invention to provide a reversed Galilean viewfinder having a long overall length and comprising three lens elements for flexibility during camera design.

It is another object of this invention to provide a reversed Galilean viewfinder having a long overall length comprising three elements, in which the lens apertures are very small with respect to the overall length and the field of view of the viewfinder.

These objects are accomplished according to the present invention by a reversed Galilean viewfinder comprising a negative objective, a positive middle element and a rear negative element. The front two elements of this system correspond to the elements commonly incorporated in reversed Galilean systems. The additional rear element may be adapted to replace a window in a camera housing. Moreover, that rear element together with the middle element may be adapted to affect the magnification of the system. The additional element also provides flexibility during camera design. For example, the powers of the middle positive and the rear negative elements may be increased to obtain a higher magnification than is obtained with two lens systems of similar clear aperture size. In addition, the three elements permit corrections of the three significant aberrations in such viewfinders, namely distortion, field curvature and coma, without requiring the use of aspheric surfaces.

Other objects and advantages of the invetnion will be apparent from the following description taken in connection with the accompanying drawing, which is a cross-sectional view of a reversed Galilean viewfinder system according to the invention.

In the drawing a reversed Galilean viewfinder according to the invention is shown having a biconcave negative objective L1, a biconvex positive middle element L2 and a rear meniscus negative element L3. Although it is not illustrated, the subject system may also include a means for framing the field of view, such as a von Albada system.

The viewfinder elements illustrated in the drawing may have the following specifications wherein R, T and S refer respectively to the radii of curvature of the lens surfaces, the thicknesses of the lens elements and spacings, numbered by subscript from front to rear and wherein all three lens elements have an index of refraction for the D line of approximately 1.49 and a dispersive power of approximately 57.4.

EXAMPLE
Magnification=.54x

| Lenses | Radii (inches) | Thicknesses and spacings (inches) |
|---|---|---|
| L1 | $R_1=-3.68$ | $T_1=.06$ |
|    | $R_2=.88$   | $S_1=1.92$ |
| L2 | $R_3=4.27$  | $T_2=.12$ |
|    | $R_4=-1.71$ | $S_2=2.15$ |
| L3 | $R_5=-1.14$ | $T_3=.04$ |
|    | $R_6=-1.79$ | |

Although the invention has been described in considerable detail with reference to certain preferred embodiments thereof, it will be understood that variations and modifications can be effected without departing from the spirit and scope of the invention as described hereinabove.

I claim:

1. A reversed Galilean viewfinder comprising a negative objective, lens element, a middle positive lens element and a rear negative lens element, the lens elements having substantially the following characteristics and spatial relations in which the lens elements are numbered from the front, R, T and S refer respectively to the radii of curvature of the lens element surfaces, the thicknesses of the lens elements and spacings, numbered by subscript from front to rear and wherein all three lens elements have an index of refraction for the D line of approximately 1.49 and a dispersive power of approximately 57.4:

EXAMPLE
Magnification=.54x

| Lenses | Radii (inches) | Thicknesses and spacings (inches) |
|---|---|---|
| $L_1$ | $R_1=-3.68$ | $T_1=.06$ |
| | $R_2=.88$ | $S_1=1.92$ |
| $L_2$ | $R_3=4.27$ | $T_2=.12$ |
| | $R_4=-1.71$ | $S_2=2.15$ |
| $L_3$ | $R_5=-1.14$ | $T_3=.04$ |
| | $R_6=-1.79$ | |

References Cited
FOREIGN PATENTS
881,337   1/1943   France.

JOHN K. CORBIN, Primary Examiner

U.S. Cl. X.R.
350—225